United States Patent
Kaushal et al.

(10) Patent No.: US 12,511,396 B2
(45) Date of Patent: Dec. 30, 2025

(54) SECURITY COMPLIANCE IN INTEGRATION CONNECTORS

(71) Applicant: Oracle International Corporation, Redwood Shores, CA (US)

(72) Inventors: Anuj Kaushal, Noida (IN); Sumit Aneja, Haridwar (IN)

(73) Assignee: Oracle International Corporation, Redwood Shores, CA (US)

( * ) Notice: Subject to any disclaimer, the term of this patent is extended or adjusted under 35 U.S.C. 154(b) by 97 days.

(21) Appl. No.: 18/422,029

(22) Filed: Jan. 25, 2024

(65) Prior Publication Data

US 2025/0245329 A1    Jul. 31, 2025

(51) Int. Cl.
G06F 21/57    (2013.01)

(52) U.S. Cl.
CPC ................... *G06F 21/57* (2013.01)

(58) Field of Classification Search
CPC ...................................... G06F 21/57
See application file for complete search history.

(56) References Cited

U.S. PATENT DOCUMENTS

| | | | |
|---|---|---|---|
| 10,911,524 B2 | 2/2021 | Raghu | |
| 11,681,798 B2 * | 6/2023 | Bravo | G06F 21/83 726/23 |
| 2014/0173738 A1 * | 6/2014 | Condry | G06F 21/577 726/25 |
| 2017/0264612 A1 * | 9/2017 | Kaushal | H04L 63/205 |
| 2020/0167476 A1 * | 5/2020 | Boulton | G06F 21/563 |
| 2021/0075749 A1 | 3/2021 | Viswanathan et al. | |
| 2021/0112088 A1 * | 4/2021 | Ramasamy | H04L 63/1433 |
| 2022/0130380 A1 | 4/2022 | Touati et al. | |

OTHER PUBLICATIONS

About Security Scorecard and Risk Cloud, https://www.logicgate.com/platform/integrations/securityscorecard-risk-cloud-integration/, downloaded circa Sep. 2023, 03 Pages.

(Continued)

*Primary Examiner* — Beemnet W Dada
(74) *Attorney, Agent, or Firm* — IPHORIZONS PLLC; Narendra Reddy Thappeta

(57) ABSTRACT

Aspects of the present disclosure provide security compliance in integration connectors. In one embodiment, a system receives a definition data specifying implementation details of an integration connector. The system checks by inspecting the definition data, whether the implementation details are in compliance with a set of security rules and computes a security score for the integration connector based on the compliance determined by the checking. According to an aspect, the system displays to a user, the security score for the integration connector along with a set of warnings about the compliance. According to another aspect, the system monitors a run-time operation of the integration connector. In response to identifying, based on the monitoring, that a security rule of the set of security rules has been violated, the system stops the operation of the integration connector and sends an error indicating that the security rule has been violated.

20 Claims, 17 Drawing Sheets

(56) References Cited

OTHER PUBLICATIONS

Identify, Assess, and Quantify Third-Party Risks With Risk Cloud, https://www.logicgate.com/solutions/third-party-risk-management/, downloaded circa Sep. 2023, 03 Pages.

Integrate, Automate, and Scale Your Risk Management Program, https://www.logicgate.com/platform/integrations/#filter=, downloaded circa Sep. 2023, 03 Pages.

Secure score, https://learn.microsoft.com/en-us/azure/defender-for-cloud/secure-score-security-controls, downloaded circa Jun. 19, 2023, 10 Pages.

Divya Mary, Simplify Integration with third-party application with SAP Cloud Platform Open Connectors, https://blogs.sap.com/2018/09/24/blog-series-simplify-integration-with-third-party-application-with-sap-cloud-platform-open-connectors/, Sep. 24, 2018, 03 Pages.

Simplify connectivity to any application with Integration Suite—Open Connectors, https://discovery-center.cloud.sap/missiondetail/3097/3117/?tab=overview, downloaded circa Sep. 2023, 02 Pages.

Marketplace Connectors, https://help.salesforce.com/s/articleView?id=sf.dato_mark_connectors.htm&type=5, downloaded circa Sep. 2023, 01 Page.

LockPath and SecurityScorecard Partner to Increase Efficiency in Vendor Risk Management, https://securityscorecard.com/company/press/lockpath-and-securityscorecard-partner-to-increase-efficiency-in-vendor-risk-management/, Nov. 14, 2017, 02 Pages.

Cloud Connector Installation, https://docs.citrix.com/en-us/citrix-cloud/citrix-cloud-resource-locations/citrix-cloud-connector/installation, downloaded circa Sep. 2023, 03 Pages.

Connectors & Integrations, https://www.processunity.com/vendor-risk-management/integration-and-connectors/, downloaded circa Sep. 2023, 01 Page.

Securityscorecard connector, https://www.processunity.com/wp-content/uploads/2020/04/Datasheet-SecurityScorecard-Connector-190106.pdf, Apr. 2020, 02 Pages.

Connectors, https://docs.tenable.com/vulnerability-management/Content/Settings/cloud-connectors/Connectors.htm, downloaded circa Sep. 2023, 02 Pages.

* cited by examiner

```
"functions": [
{
    "name" : "logFunction ",
    "type" : "custom",
    "operation": "connectivity:: log"
} ],
"states": [
{
    ...
    "actions": [
    {
        "functionRef ":
        {
            "refName": "logFunction ",
            "arguments": {"message":<String/JQexpression>
        }
    }
} ]
```

510

```
"settings":
{
    "supportsNonSSLEndpoints": true
    "supportsJsonSanitisation": false
    "followRedirects": false
    "supportsConnectivityAgent": true
}
```

530 — `"allowedDomains": ["*.myApp.com"]`

540 —
```
"securityPolicies": [
{
      "type": "managed",
      "policy": "OAUTH_CLIENT_CREDENTIALS",
      …
      "scope": "ACTION",
            "securityProperties": [
                  {
                        "name": "oauth.client.id",
                        …
                        "hidden": false,
                        "required": true
                  },
                  {
                        "name": "oauth.client.secret",
                  …
                  }, ]
},
```

FIG. 5B

| Category | |
|---|---|
| Trigger | inbound: certified |
| Trigger | inbound: uncertifie |
| Trigger | supports |
| Invoke | Outboun |
| Invoke | followRe followRe followRe |
| Invoke | supports |
| | supports |

```
{
    "info":
    {
        "id": "develop:myApp",
        "publisherInfo":
        {
            "name": "Acme Corporation"
        },
    "settings":
    {
        "supportsAction": true,"supportsTrigger": false,
        "followRedirects": true,
        "supportsJsonSanitisation":
        true,"supportsNonSSLEndpoints":
        true,"allowedDomains":" *.acme.com"
    }},
```

720

| Parameter | Value | Score | Max | Warning |
|---|---|---|---|---|
| supportsJsonSanitisation | true | 1 | 1 | No |
| supportsConnectorLevelLogging | true | 0 | 1 | Yes |
| maxNumberOfNetworkCalls | 1 | 2 | 2 | No |
| supportsNonSSLEndpoints | true | 0 | 1 | Yes |
| outboundSecurityPolicy | oauth | 5 | 5 | No |
| followRedirects | false | 3 | 3 | No |
| allowedDomains | *.myApp.com | 1 | 2 | No |
| Total | | 12 | 14 | |
| Security Score = 86% | | | | |

```
{
    "info":
    {
        "id": "develop:myApp",
        "publisherInfo":
        {
            "name": "Acme Corporation"
        },
    "settings":
    {
        "supportsAction": true,"supportsTrigger": true,
        "followRedirects": false,
        "supportsJsonSanitisation":
        true,"supportsNonSSLEndpoints":
        false,"allowedDomains":" *.acme.com"
    }},
```

740

| Parameter | Value | Score | Max | Warning |
|---|---|---|---|---|
| supportsJsonSanitisation | true | 1 | 1 | No |
| supportsConnectorLevelLogging | true | 0 | 1 | Yes |
| maxNumberOfNetworkCalls | 1 | 2 | 2 | Yes |
| supportsNonSSLEndpoints | true | 0 | 1 | No |
| allowedDomains | *.myApp.com | 1 | 2 | No |
| inboundSecurityPolicy | oauth | 5 | 5 | No |
| supportsCORS | NA | 0 | 0 | No |
| outboundSecurityPolicy | oauth | 5 | 5 | No |
| followRedirects | false | 3 | 3 | No |
| InboundSecurityPolicy | true | 5 | 5 | No |
| supportsMTLS | true | 0 | 0 | No |
| supportsConnectivityAgent | false | 0 | 1 | No |
| Total | | 22 | 26 | |
| Security Score = 85% | | | | |

```
{
    "info":
    {
        "id": "develop:myApp",
        "publisherInfo":
        {
            "name": "Acme Corporation"
        },
    "settings":
    {
        "supportsAction": true,"supportsTrigger": true,
        "followRedirectsWithHeaders": true,
        "supportsJsonSanitisation":
        false,"supportsNonSSLEndpoints":
        true,"allowedDomains":" *.*"
    }},
```

760

| Parameter | Value | Score | Max | Warning |
|---|---|---|---|---|
| supportsJsonSanitisation | false | 0 | 1 | Yes |
| supportsConnectorLevelLogging | true | 0 | 1 | Yes |
| maxNumberOfNetworkCalls | 3 | 0 | 2 | Yes |
| supportsNonSSLEndpoints | true | 0 | 1 | Yes |
| allowedDomains | *.* | 0 | 2 | Yes |
| inboundSecurityPolicy | oauth | 5 | 5 | No |
| supportsCORS | NA | 0 | 0 | No |
| outboundSecurityPolicy | oauth | 5 | 5 | No |
| followRedirects with headers | true | 0 | 3 | Yes |
| Total |  | 10 | 20 |  |
| Security Score = 50% | | | | |

*FIG. 7C*

SECURITY COMPLIANCE IN INTEGRATION CONNECTORS

BACKGROUND OF THE DISCLOSURE

Technical Field

The present disclosure relates to server computing and more specifically to security compliance in integration connectors.

Related Art

Integration connectors refer to intermediate software components that facilitate an application/data service to connect and interface (send/receive data) with other applications, data services, data sources, devices, etc., (target components) according to pre-specified conventions. Integration connectors typically abstract the application programming interfaces (APIs), message formats, security and other aspects of the target components. Accordingly, integration connectors act as front-ends to the target components and simplify how applications, technologies and processes can be integrated to implement desired workflows.

Security compliance refers to the process of assessing and monitoring hardware/software components to ensure that the components comply with desired access requirements. Such requirements may be regulatory, industry standards, local security standards, etc., as is well known in the relevant arts. Such requirements may be related to the target component sought to be interfaced with or related to the manner of access.

Aspects of the present disclosure are directed to providing such security compliance in integration connectors.

BRIEF DESCRIPTION OF THE DRAWINGS

Example embodiments of the present disclosure will be described with reference to the accompanying drawings briefly described below.

FIGS. 5A-5B together illustrates the manner in which definition data for an integration connector is specified in one embodiment.

FIGS. 7A-7C illustrate the manner in which security scores are computed in one embodiment.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE EMBODIMENTS OF THE DISCLOSURE

1. Overview

Figure 1:
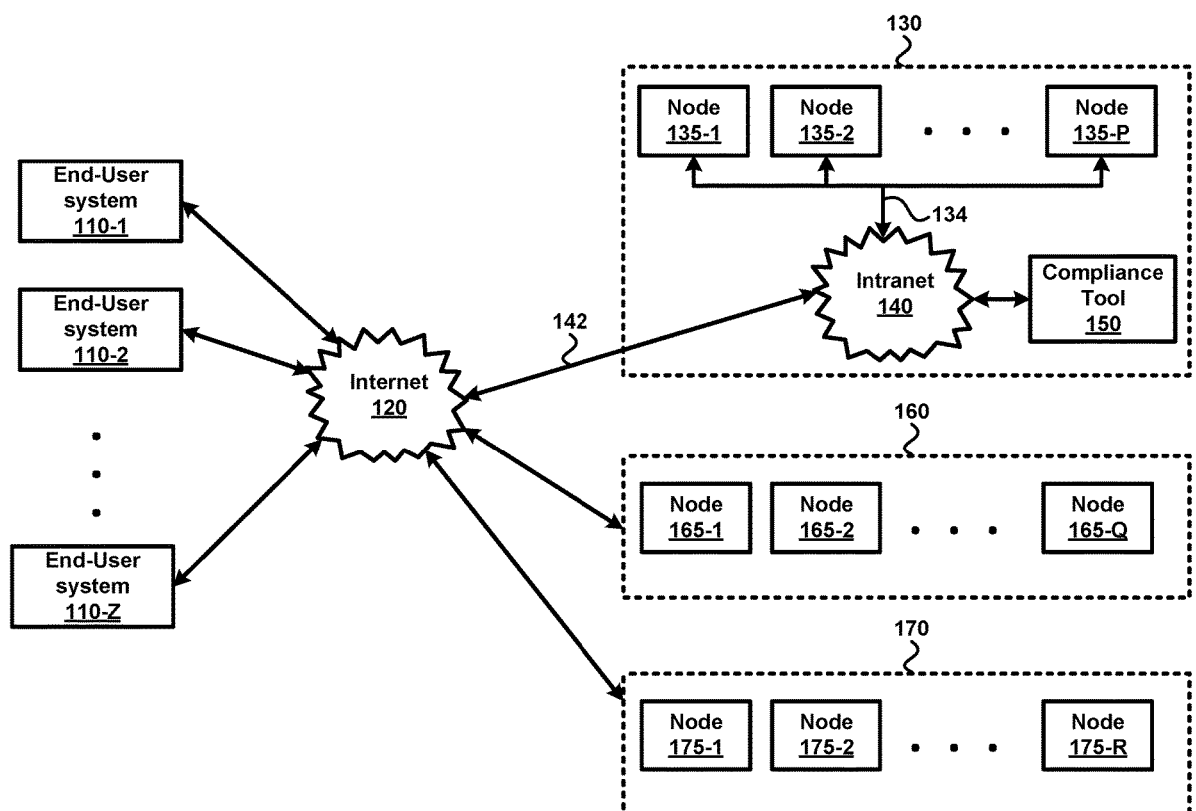
FIG. 1 is a block diagram illustrating an example computing environment in which several aspects of the present disclosure can be implemented.

An aspect of the present disclosure provides security compliance in integration connectors. In one embodiment, a digital processing system receives a definition data specifying implementation details of an integration connector. The system checks by inspecting the definition data, whether the implementation details are in compliance with a set of security rules and computes a security score for the integration connector based on the compliance determined by the checking.

According to another aspect of the present disclosure, the system displays to a user, the security score for the integration connector along with a set of warnings about the compliance.

According to one more aspect of the present disclosure, the system computes the security score by evaluating the compliance of the definition data with each security rule of the set of security rules to determine a corresponding rule score and calculating the security score based on the corresponding rule scores for the set of security rules.

According to yet another aspect of the present disclosure, the definition data contains a set of attributes, with a first security rule of the set of security rules indicating a first attribute of the set of attributes and a first condition. The system checks whether a first value specified for the first attribute in the definition data satisfies the first condition, determines a first rule score if the first value satisfies the first condition, and adds the first rule score to the security score.

According to an aspect of the present disclosure, a second security rule of the set of security rules indicates a second condition. The system checks whether the second condition is satisfied based on the values for two or more of set of attributes specified in the definition data, determines a second rule score if the second condition is satisfied, and adds the second rule score to the security score.

According to another aspect of the present disclosure, the system monitors a run-time operation of the integration connector. In response to identifying, based on the monitoring, that a security rule of the set of security rules has been violated, the system stops the operation of the integration connector and sends an error indicating that the security rule has been violated.

According to one more aspect of the present disclosure, a third security rule of the set of security rules indicates a limit on a run-time characteristic. The system monitors a run-time value of the run-time characteristic during operation of the integration connector and identifies that the third security rule has been violated when the run-time value exceeds the limit. The error indicates that the third security rule has been violated.

According to yet another aspect of the present disclosure, a fourth security rule of the set of security rules indicates a run-time policy to be applied during operation. The system monitors a policy applied during operation of the integration connector and identifies that the fourth security rule has been violated when the policy applied does not match the run-time policy. The error indicates that the fourth security rule has been violated.

According to an aspect of the present disclosure, the integration connector (noted above) is deployed in a node of multiple nodes in a computing infrastructure, with the integration connector designed to provide a front-end to a target component deployed the nodes. The system determines whether the (computed) security score is above a threshold and if the security score is determined to be above the threshold, enables the integration connector on the node. After the enabling, services deployed in the nodes are facilitated to interface with the target component via the integration connector.

According to one more aspect of the present disclosure, the definition data (noted above) is received from an end-user system in response to a user creating a work flow using the integration connector.

Several aspects of the present disclosure are described below with reference to examples for illustration. However, one skilled in the relevant art will recognize that the disclosure can be practiced without one or more of the specific details or with other methods, components, materials and so forth. In other instances, well-known structures, materials, or operations are not shown in detail to avoid obscuring the features of the disclosure. Furthermore, the features/aspects described can be practiced in various combinations, though only some of the combinations are described herein for conciseness.

2. Example Environment

FIG. 1 is a block diagram illustrating an example computing environment in which several aspects of the present disclosure can be implemented. The block diagram is shown containing end-user systems 110-1 through 110-Z (Z representing any natural number), Internet 120, and computing infrastructures 130, 160 and 170. Computing infrastructure 130 in turn is shown containing nodes 135-1 through 135-P (P representing any natural number), intranet 140 and compliance tool 150.

Computing infrastructure 160 in turn is shown containing nodes 165-1 through 165-Q (Q representing any natural number). Computing infrastructure 170 in turn is shown containing nodes 175-1 through 175-R (R representing any natural number). The end-user systems and nodes are collectively referred to by 110, 135, 165 and 175 respectively.

Merely for illustration, only representative number/type of systems are shown in FIG. 1. Many environments often contain many more systems, both in number and type, depending on the purpose for which the environment is designed. Each block of FIG. 1 is described below in further detail.

Each of computing infrastructures 130, 160 and 170 is a collection of physical processing nodes (135, 165 and 175), connectivity infrastructure, data storages, administration systems, etc., which are engineered to together host application/data services. Computing infrastructure 130/160/170 may be a cloud infrastructure such as Amazon Web Services (AWS) available from Amazon.com, Inc., Google Cloud Platform (GCP) available from Google LLC, etc. that provides a virtual computing infrastructure for various customers, with the scale of such computing infrastructure being specified often on demand. Alternatively, computing infrastructures 130/160/170 may also correspond to an enterprise system (or a part thereof) on the premises of the customers (and accordingly referred to as "On-prem" infrastructure). Computing infrastructures 130/160/170 may also be a "hybrid" infrastructure containing some nodes of a cloud infrastructure and other nodes of an on-prem enterprise system.

All the systems of each computing infrastructures 130/160/170 are assumed to be connected via a corresponding intranet (such as intranet 140 providing connectivity to nodes 135). Internet 120 extends the connectivity of these (and other systems of the computing infrastructures) with external systems such as end-user systems 110. Each of the intranets (140) and Internet 120 may be implemented using protocols such as Transmission Control Protocol (TCP) and/or Internet Protocol (IP), well known in the relevant arts.

In general, in TCP/IP environments, a TCP/IP packet is used as a basic unit of transport, with the source address being set to the TCP/IP address assigned to the source system from which the packet originates and the destination address set to the TCP/IP address of the target system to which the packet is to be eventually delivered. An IP packet is said to be directed to a target system when the destination IP address of the packet is set to the IP address of the target system, such that the packet is eventually delivered to the target system by Internet 120 and respective intranet (such as 140). When the packet contains content such as port numbers, which specifies a target application, the packet may be said to be directed to such application as well.

Each of end-user systems 110 represents a system such as a personal computer, workstation, mobile device, computing tablet etc., used by users to generate (user) requests directed to application/data services executing in computing infrastructures 130/160/170. A user request refers to a specific technical request (for example, Universal Resource Locator (URL) call) sent to a server system from an external system (here, user system) over Internet 120, typically in response to a user interaction at end-user systems 110. The user requests may be generated by users using appropriate user interfaces (e.g., web pages provided by an application executing in a node, a native user interface provided by a portion of an application downloaded from a node, etc.).

In general, a user system requests an application/data service for performing desired tasks and receives the corresponding responses (e.g., web pages) containing the results of performance of the requested tasks. The web pages/responses may then be presented to a user by a client application such as the browser. Each user request is sent in the form of an IP packet directed to the desired system or application/data service, with the IP packet including data identifying the desired tasks in the payload portion.

Some of nodes 135/165/175 may be implemented as corresponding data stores. Each data store represents a non-volatile (persistent) storage facilitating storage and retrieval of data by application/data services executing in the other systems/nodes of computing infrastructures 130/160/170. Each data store may be implemented as a corresponding database server using relational database technologies and accordingly provide storage and retrieval of data using structured queries such as SQL (Structured Query Language). Alternatively, each data store may be implemented as a corresponding file server providing storage and retrieval of data in the form of files organized as one or more directories, as is well known in the relevant arts.

Some of the nodes 135/165/175 may be implemented as corresponding server systems. Each server system represents a server, such as a web/application server, constituted of appropriate hardware, executing application/data services capable of performing one or more tasks. The tasks may be specified as part of user requests received from end-user systems 110 or node requests received from nodes of same/other cloud infrastructures.

A server system, in general, receives a task request and performs the tasks requested in the task request. A server system may use data stored internally (for example, in a non-volatile storage/hard disk within the server system), external data (e.g., maintained in a data store) and/or data received from external sources (e.g., received from a user) in performing the requested tasks. The server system then sends the result of performance of the tasks to the requesting end-user system (one of 110) or node (one of 135/165/175) as a corresponding response to the task request. The results may be accompanied by specific user interfaces (e.g., web pages) for displaying the results to a requesting user.

It may be necessary or desirable for application/data services (source components) executing in various nodes (135/165/175) to connect and interface with other application services, data services, data sources, devices, etc. (target components) deployed in other nodes of computing infrastructures 130/160/170. Integration connectors facilitate such interfacing between application services as described below with examples.

3. Integration Connectors

Figure 2:
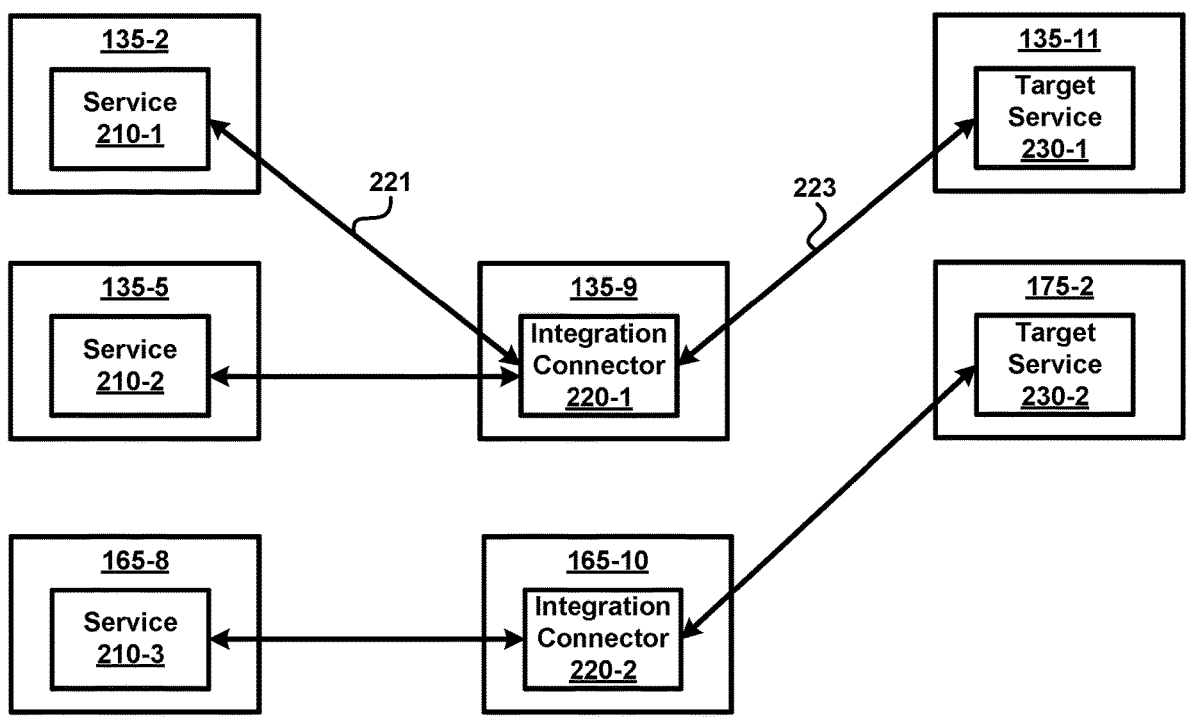
FIG. 2 is a block diagram illustrating the manner in which integration connectors are provided in one embodiment.

FIG. 2 is a block diagram illustrating the manner in which integration connectors are provided in one embodiment. Each of services 210-1 to 210-3 and target services 230-1 and 230-2 represent application/data services deployed in various nodes (135/165/175) of computing infrastructures 130/160/170. Services 210-1 to 210-3 represent source components that need to connect and interface with target services 230-1 and 230-3 (target components).

Integration connectors 220-1 and 220-2 facilitate such interfacing between services 210-1 to 210-3 and 230-1 to 230-2. Specifically, integration connector 220-1 represents an intermediate software component that facilitate source components (services) to interface with target service 230-1. As such, integration connector 220-1 abstracts the application programming interfaces (APIs), message formats, security and other aspects of target service 230-1, and accordingly, acts as a front-end to target service 230-1. Integration connection 220-1 receives requests from services 210-1 and 210-2, performs any desired operations such as data mapping, data conversion, etc., invokes the appropriate interfaces of target service 230-1, receives the corresponding responses, and provides appropriate responses to services 210-1 and 210-2. Similarly, integration connector 220-2 facilitates the interfacing between service 210-3 and target service 230-2.

It may be appreciated that a large number (typically 100+) of integration connectors may be provided in the computing environment of FIG. 1. In one embodiment, the integration connectors are provided as part of an integration platform as a service (iPaaS) that facilitates the management of integration connectors (also referred to as "adapters"). The integration connectors of an iPaaS platform enable an application/data service to interface with on-premise systems, cloud applications, cloud data sources, cloud computing clusters, Internet of Things (IoT) devices, etc. as is well known.

In the following disclosure, it is assumed for illustration that the iPaaS is implemented as a cloud-based service in computing infrastructure 130, with integration connectors being deployed and executing in nodes 135. An example of the such an iPaaS platform is Oracle Integration Cloud Service Release 16.3.1 available from Oracle International Corporation, the assignee of the instant application.

Generally, integration platforms provide a rich set of pre-built/out-of-box integration connectors. However, such pre-built integration connectors may not always meet the requirements of developers of application services/source components. As such, the iPaaS platform also facilitates hosting of integration connectors provided by third-party providers/developers. It may be appreciated that having a diverse source for integration connectors may make it challenging for developers to trust these integration connectors with data and access to the target services. Specifically, the developer may desire that the specific integration connector the developer seeks to use operates securely when interfacing with the target service.

Compliance tool 150, provided according to several aspects of the present disclosure, provides security compliance in integration connectors as described below with examples. Though shown as a separate entity in computing infrastructure 130, in alternative embodiments, compliance tool 150 may be implemented on one of nodes 135. The manner in which compliance tool 150 provides security compliance of integration connectors is described below with examples.

4. Security Compliance in Integration Connectors

Figure 3:
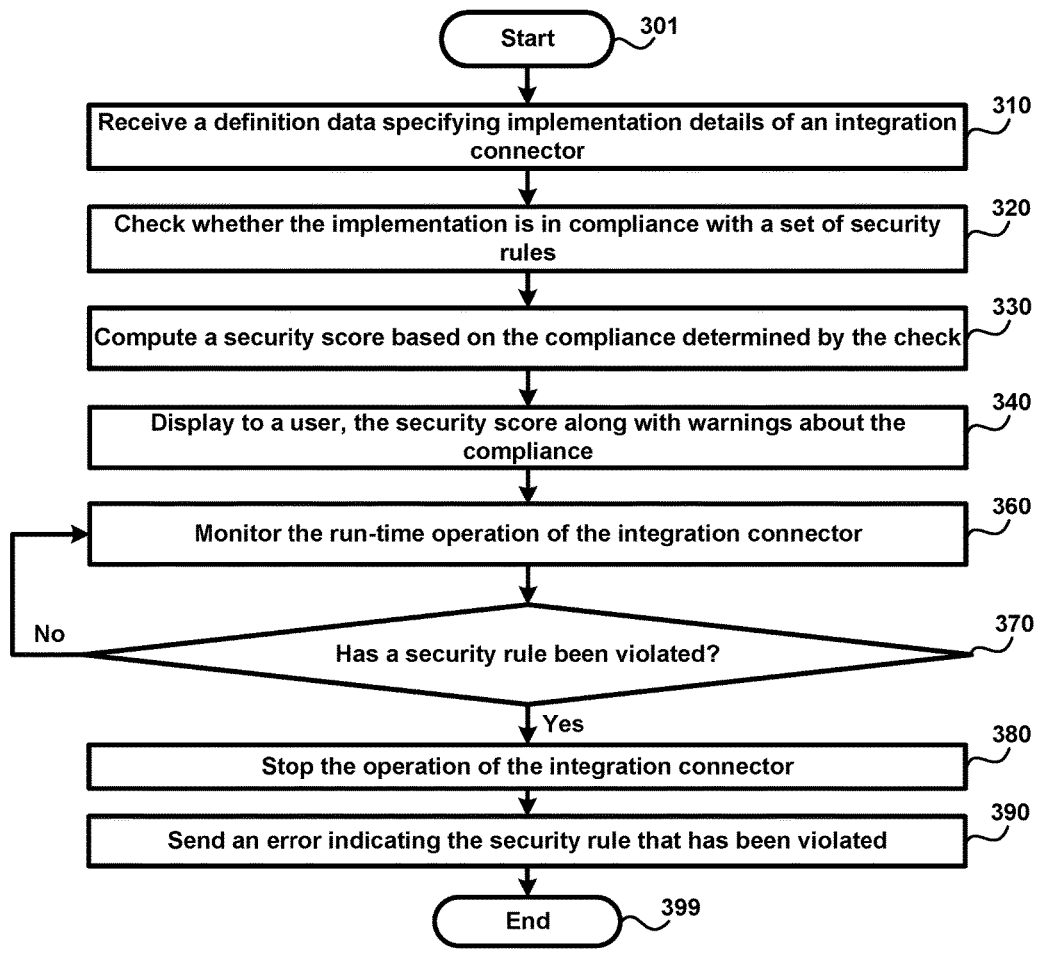
FIG. 3 is a flow chart illustrating the manner in which security compliance in integration connectors is provided according to aspects of the present disclosure.

FIG. 3 is a flow chart illustrating the manner in which security compliance in integration connectors is provided according to aspects of the present disclosure. The flowchart is described with respect to the systems of FIGS. 1, 2A and 2B, in particular compliance tool 150, merely for illustration. However, many of the features can be implemented in other environments also without departing from the scope and spirit of several aspects of the present invention, as will be apparent to one skilled in the relevant arts by reading the disclosure provided herein.

In addition, some of the steps may be performed in a different sequence than that depicted below, as suited to the specific environment, as will be apparent to one skilled in the relevant arts.

Many of such implementations are contemplated to be covered by several aspects of the present invention. The flow chart begins in step 301, in which control immediately passes to step 310.

In step 310, compliance tool 150 receives a definition data specifying implementation details of an integration connector (such as 220-1). Broadly, the definition data specifies the target service (such as 230-1) to be accessed by the integration connector, the specific authentication/authorization used for access, the policies to be applied during access, details of the packets sent/received from the target component. In one embodiment, the definition data contains one or more attributes with corresponding values indicating the above noted details.

The definition data may be received from a developer of the integration connector (using one of end-user systems 110) or from the iPaaS platform (from one of nodes 135). According to an aspect, the definition data is received from the end-user system in response to a user creating a work flow (such as 250) using the integration connector (220-1).

In step 320, compliance tool 150 checks, by inspecting the received definition data, whether the implementation is in compliance with a set of security rules. The set of security rules may be pre-configured or may be dynamically received from the iPaaS platform (from one of nodes 135). Each security rule typically includes a condition, with checking entailing determining whether the values of one or more attributes in the definition data satisfies the condition.

In step 330, compliance tool 150 computes a security score based on the compliance determined by the checking in step 320. In embodiments described herein, a higher score indicates higher compliance and a lower score indicates lower compliance. According to an aspect, compliance tool 150 evaluates the compliance of the definition data with each security rule of the set of security rules to determine a corresponding rule score and then calculates the security score based on the corresponding rule scores for the set of security rules.

In step 340, compliance tool 150 displays to a user (such as a developer), the security score along with warnings about the compliance. The security score may be displayed on a display unit (not shown) associated with one of end-user systems 110. The warnings about the compliance may represent security concerns with the integration connector.

It may be appreciated that if an integration connector is determined to have a high compliance score, the integration connector may be hosted by the iPaaS platform and thereafter used by other developers to interface with the corresponding target component. Aspects of the present disclosure also ensure that security compliance is enforced during the run-time of the integration connector as described in detail below.

In step 360, compliance tool 150 monitors the run-time operation of the integration connector. Such monitoring may entail intercepting the packets sent/received by the integration connector and inspecting the intercepted packets.

In step 370, compliance tool 150 checks whether a security rule of the set of security rule has been violated. A security rule is deemed to be violated if a condition indicated in the security rule is determined to be not satisfied by at least one packet/communication made by the integration connector. If no violation is identified, control passes to step 360 where compliance tool 150 continues to monitor the subsequent packets/communications from/to the integration connector. If a violation is identified, control passes to step 380.

In step 380, compliance tool 150 stops the operation of the integration connector if the run-time operation of the integration connector has caused a violation of a security rule. Such stopping (or disabling in some environments) may ensure that additional violations can be pro-actively avoided.

In step 390, compliance tool 150 sends an error indicating the (specific) security rule that has been violated. Such an error may be sent to one of end-user systems 110, and the error may be subsequently display on a display unit (not shown) associated with the end-user system. Control passes to step 399, where the flowchart ends.

Thus, compliance tool 150 provides security compliance in integration connectors.

According to another aspect, compliance tool 150 determines whether the security score (computed in step 330) is above a threshold (a pre-defined/pre-configured value). If the security score is determined to be above the threshold, compliance tool 150 enables the integration connector (220-1). Upon enabling the integration connector, services (such as 210-1) are facilitated to interface with target component/service (230-1) via the integration connector (220-1).

The manner in which compliance tool 150 provides several aspects of the present disclosure according to the steps of FIG. 3 is described below with examples.

5. Illustrative Example

FIGS. 4, 5A-5B, 6, 7A-7C and 8A-8C together illustrate the manner in which security compliance in integration connectors is provided in one embodiment. Each of the Figures is described in detail below.

Figure 4:
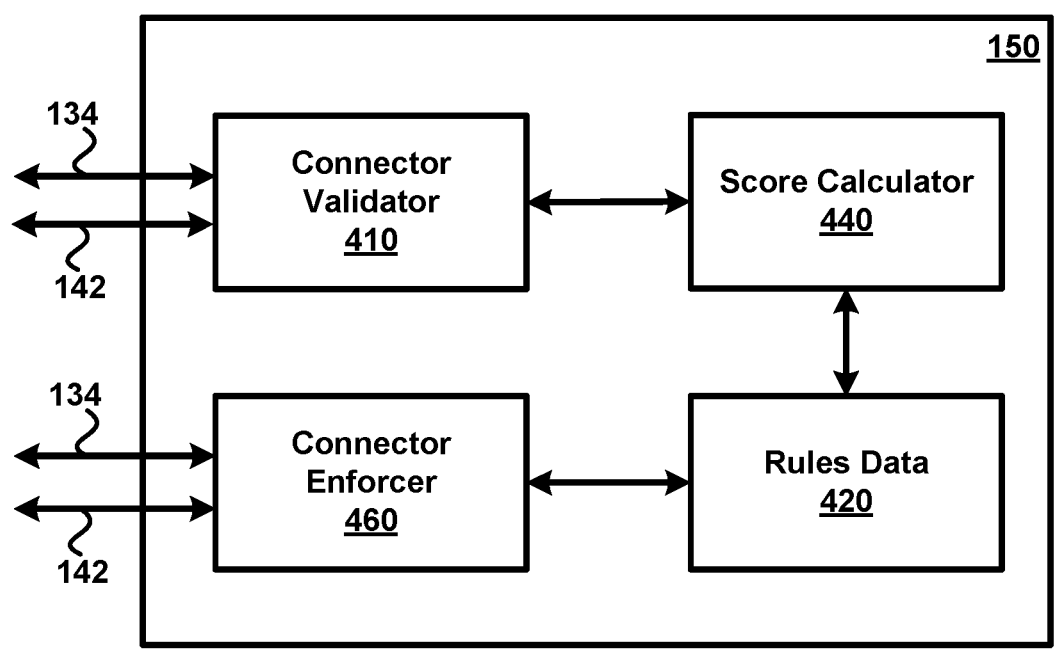
FIG. 4 is a block diagram illustrating the manner in which a compliance tool is implemented in one embodiment.

FIG. 4 is a block diagram illustrating the manner in which a compliance tool (150) is implemented in one embodiment. The block diagram is shown containing connector validator 410, rules data 420, score calculator 440, and connector enforcer 460. Each of the blocks is described in detail below.

Connector validator 410 receives a definition data specifying implementation details of an integration connector (such as 220-1) sought to be validated and then forwards the received definition data to score calculator 440. In one embodiment, the definition data contains one or more attributes (having associated names) with corresponding values. The definition data may be received (via path 142) from one of end-user systems 110 or received (via path 134) from nodes 135 hosting the iPaaS platform. According to an aspect, connector validator 410 receives (via path 142) the definition data from the end-user system in response to a user creating a work flow (such as 250) using the integration connector (220-1). The manner in which definition data may be specified/received is described below with examples.

FIGS. 5A-5B together illustrates the manner in which definition data for an integration connector is specified in one embodiment. For illustration, the definition data is shown specified according to JSON (JavaScript Object Notation). However, in alternative embodiments, the setup data may be maintained according to other data formats (such as extensible markup language (XML), etc.) and/or using other data structures (such as database tables, lists, trees, etc.), as will be apparent to one skilled in the relevant arts by reading the disclosure herein.

An example definition data for an integration connector named "Microsoft Task" is shown in Appendix A. The definition data of Appendix A may be specified by a developer (or generated based on inputs provided by the developer) when the developer is creating a workflow using the integration connector. Some sample data portions that may be present in the definition data are described in detail below.

Data portion 510 specifies the details of logging performed in the integration connector. Data portion 520 specifies values (such as "true", "false") for various attributes (named "supportsNonSSLEndpoints", "supportsJsonSanitisation", "followRedirects", etc.) used to control the manner in which the integration connector interfaces with the target services. Data portion 530 specifies the target endpoints (URLs of the target services) the integration connector is authorized to interface with. Data portion 540 specifies the various security policies to be applied when the integration connector interfaces with the target services.

Referring again to FIG. 4, rules data 420 specifies a set of security rules used to determine the security compliance in integration connectors. Each security rule typically specifies a condition for one or more attributes in the definition data. Rules data 420 may be specified and maintained in any convenient form. For example, rules data 420 may be maintained as one or more files or alternatively in the form of one or more tables (in a database). Though shown internal to compliance tool 150, in alternative embodiments, rules data 420 may be maintained in one or more nodes 135/165/175 implemented as corresponding data stores. The manner in which rules data (420) may be specified/maintained is described below with examples.

6. Specifying Security Rules

Figure 6:
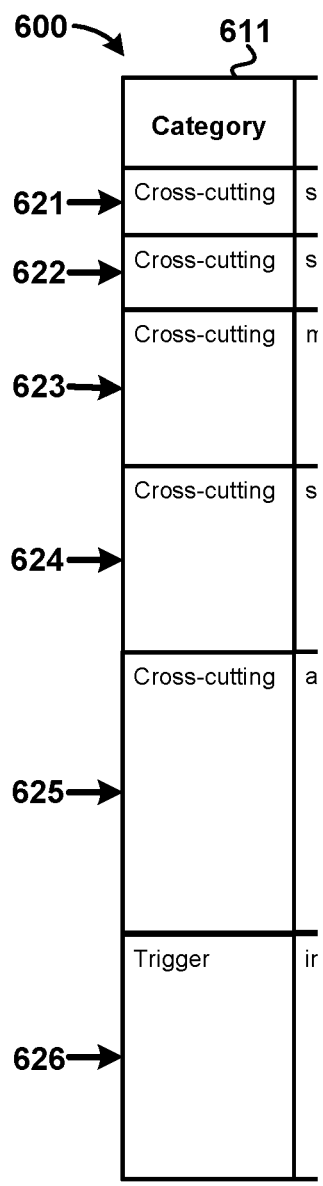
FIG. 6 depicts the manner in which security rules are maintained in one embodiment.

FIG. 6 depicts the manner in which security rules are maintained in one embodiment.

Though shown in the form of a table, the security rules may be specified/maintained according to other data formats (such as extensible markup language (XML), etc.) and/or using other data structures (such as lists, trees, etc.), as will be apparent to one skilled in the relevant arts by reading the disclosure herein.

Table 600 depicts a portion of the security rules maintained as part of rules data 420. Column 611 "Category" specifies the category of each security rule. The category may be one of "Trigger", "Invoke" or "Cross-cutting". Broadly, "Trigger" rules are applicable when an integration connector has the ability to receive messages from the target service and trigger business workflows, while "Invoke" rules are applicable when an integration connector has the ability to send messages to the target service from business workflows, and "Cross-cutting" rules are applicable for all integration connectors.

Column 612 "Parameter Name" specifies the parameter/attribute name (to be checked in the definition data) for the corresponding security rule. Column 613 "Type" indicates whether the value of the attribute is "Declared"—the value is specified against the attribute name in the definition data, or "Inferred"—the value of the parameter is to be determined based on more than one attribute values specified in the definition data. Column 614 "Description" specifies the possible values/conditions of the parameter for the corresponding security rule.

Column 615 "Max-Score" specifies the maximum (rule) score that can be contributed by the corresponding security rule, while column 616 "Score impact" specifies the conditions and corresponding (rule) scores to be assigned for the corresponding security rule. Column 617 "Enforcement point" specifies when the corresponding security rule is to be enforced with the text "Design time" indicating that the security rule is applicable during (static) validation of the integration connector, and the text "Runtime" indicating that the security rule is applicable during run-time operation (that is, when executing) of the integration connector.

Each of rows 621-633 specifies the details of a corresponding security rule. For example, row 621 indicates that the corresponding security rule is of category "Cross-cutting" (that is applicable to all integration connectors), the parameter name is "supportsJsonSanitisation", the type of the parameter is "Declared" (the value is specified in the definition data), the parameter can have values "true" and "false", the maximum (rule) score contribution is 1, a score of 1 is assigned when value="true" or 0 is assigned when value="false", and that the security rule is to applied both at Design time and Runtime for outbound calls (that is, when the integration connector interfaces with the target services). Similarly, the other rows specify the details of other corresponding security rules. Some of the security rules are further described in detail below.

Row 621 "supportsJsonSanitisation"—Integration connectors and platforms use one or the other canonical data formats instead of using native data format to help reduce integration complexity. JSON is the canonical model of choice. JSON injection attacks are considered as one of the most severe security risks. Therefore, connectors that provide guard-rails to prevent JSON injection attacks are considered to be safer in comparison to others. By default, this parameter is set to true. When true, the platform ensures stricter validation and looks out for red-flags like script injection in data being received or sent by the integration connector. When the parameter/attribute is set to false, the integration connector provides a lax form of validation which may lead to vulnerabilities in target services/systems as well as the integration platform. The value for this parameter is determined based on data portion 520.

Row 622 "supportsConnectorLevelLogging"—While logging improves the diagnosability of the application service, the logging can also cause potential vulnerabilities if not done with caution. The platform provides integration connectors with the ability to log information but such logging comes with a cost in terms of a lower security score. The integration platform will scan and figure out if an integration connector is using logging then it awards a lower score irrespective of the type of information being logged. Integration platform detects that a connector is using logging functions based on data portion 510 being present in the definition data.

Row 623 "maxNumberOfNetworkCalls"—Connectors may choose to provide coarse grained APIs for ease of integration but in reality, fulfilling those APIs may involve a series of calls to one or more backend services (referred to as composite actions). Every network call made from the integration connectors adds some costs—1) monetary costs to the account of the developer/customer; 2) introduces abstracted latency to the overall performance of a given action and thus to a consuming work flow; 3) introduces more points of failures. In one embodiment, the maximum limit/number of such network calls is set to 4. During adapter definition data (ADD) validation, the system checks the definition data to determine a count of network calls likely to be made and ensures the count is within bounds (1 to maximum limit).

Row 624 "supportsNonSSLEndpoints"—SSL (Secure Sockets Layer) is considered a basic security requirement for enterprise communication. Connectors that talk to non-SSL endpoints are introducing actors in the workflow that are susceptible to man-in-the middle attacks and thus they weaken the overall security of the platform. The value for this parameter is determined based on data portion 520.

Row 625 "allowedDomains"—The target (services) endpoints the integration connector is authorized to talk to. It is important for a developer to know the target URLs an adapter is capable of posting to. Allowed domains being specified without wildcards are of the form <subdomian>.<secondLevel-domain>.<topLeveldomain> (Examples: my.oracle.com; hcm.oracle.com; oracle.com). A single instance of allowed domains being specified without sub-domain are of the form *.<secondLevel-domain>.<topLeveldomain> (Examples: *.oracle.com).

Wildcards being used otherwise are of the form *. The warning indicated in column 616 may be displayed if the allowed domains contain any * text. The value for this parameter is determined based on data portion 530.

Row 626 "inboundSecurityPolicy=managed"—The integration connector is using a security mechanism exposed by the integration platform to secure incoming messages. In one embodiment, the integration platform supports the security mechanisms: 1) OAuth; 2) Basic Auth; 3) JWT validation; 4) HMAC digital signature; and 5) RSA digital signature. Platform exposed security mechanisms are inherently perceived to be more secure than custom security mechanisms. As noted in column 617, the specific security mechanism used by the integration connector to receive messages from calling services is determined at runtime. Compliance tool 150 may determine the runtime security mechanism and check whether the determined runtime security mechanism is one of the 5 mechanisms noted above.

Row 627 "inboundSecurityPolicy=self-managed+certified"—The integration connector is using a self-defined but certified security mechanism to secure incoming messages.

Self-managed security mechanisms are defined by the integration connector but at the same time they may also be certified by the integration platform. The integration platform considers self-managed custom security mechanisms as less secure due to the uncertainty involved. In some cases, the self-managed custom security mechanism may even be stronger than the factory delivered but still they are awarded a lower security score.

Row 628 "inboundSecurityPolicy=self-managed+uncertified"—The integration connector is using a self-defined and uncertified security mechanism to secure incoming messages. Such integration connectors are deemed risky and not allowed to be deployed on production servers. The specific value for parameters in rows 626-628 is determined based on data portion 540 in the definition data.

Row 629 "supportsCORS"—CORS (Cross-Origin Resource Sharing) provides a mechanism to allow requests from known domains or subdomains only. However, CORS is not a requirement for ALL integration connectors. This security score applies only when an integration connector opts for CORS but the developer/customer not selected appropriate allowed origins. The domains, subdomains and wild cards may be specified similar to that noted above for row 625 "allowedDomains" parameter. Though not shown, the value for this parameter may be determined based on data portions similar to data portion 530.

Row 630 "OutboundSecurityPolicy"—Connectors interact with target application services that are protected with one or more security policies. Some of the security mechanisms are considered more secure in comparison to others and thus if an integration connector talks to an application over a weak security mechanism, then it inherits the vulnerabilities exposed by the target system. The outbound security policy may be determined at runtime (as noted in column 617) similar to determination of the inbound security policy for the integration connector.

Row 631 "followRedirects", "followRedirectsWithMethodForwarding" and "followRedirectsWithHeader"—HTTP (Hypertext Transfer Protocol) specification has a series of codes 3xx reserved for redirects. An integration connector must advertise if it chooses to follow a redirect as forwarding the request to another URL (Uniform Resource Locator) may be considered a vulnerability by some customers. The values for these parameters are determined based on data portion 520. Row 633 "supportsConnectivityAgent"—The integration connector talks to a system behind a secure firewall. Thus, the adapter is inherently perceived to be secure. The value for this parameter is determined based on data portion 520.

Thus, a set of security rules are specified for providing security compliance in integration connectors. Referring again to FIG. 4, score calculator 440 receives a definition data (corresponding to an integration connector sought to be validated) from connector validator 410, checks by inspecting the received definition data, whether the implementation details are in compliance with the set of security rules specified in rules data 420 and computes a security score for the integration connector based on the compliance determined by the checking. The manner in which score calculator 440 computes a security score for an integration connector is described below with examples.

7. Computing Security Score

FIGS. 7A-7C illustrate the manner in which security scores are computed in one embodiment. According to an aspect, score calculator 440 evaluates the compliance of the received definition data with each security rule of the set of security rules (maintained in rules data 420) to determine a corresponding rule score. Score calculator 440 then calculates the security score based on the corresponding rule scores for the set of security rules.

Accordingly, each of FIGS. 7A-7C depicts a portion of the definition data (corresponding to an integration connector sought to be validated) and the corresponding manner in which the security rules of table 600 of FIG. 6 is applied and a security score is computed.

Referring to FIG. 7A, data portion 710 depicts the portion of the definition data being checked by score calculator 440, while table 720 depicts the manner in which rule scores are calculated for attribute values in data portion 710. In table 720, column "Parameter" indicates the parameter being checked (one of parameters in column 612), column "Value" indicates the value of the parameter as determined from data portion 710, column "Score" indicates the rule score calculated for the value based on the conditions specified in column 616 "Score Impact", column "Max" indicates the maximum value for the parameter as specified in column 615 for the parameter, and column "Warning" indicates whether any warning is applicable for the parameter based on the warning text in column 616.

For example, the security rule in row 621 indicates that the parameter/attribute "supportsJsonSanitisation" is to have a value of true (condition). Score calculator 440 determines that the attribute has the valued "true" in the definition data of data portion 710, and accordingly assigns a rule score of 1 (condition satisfied) for the integration connector. As another example, the security rule in row 630 "outboundSecurityPolicy" specifies a condition based on multiple attributes (like data portion 540) and accordingly score calculator determines the corresponding value based on inspection of corresponding portions (not shown) of the definition data.

After calculating the rule scores for all the security rules specified in table 600, score calculator 440 computes a security score for the integration connector using the below formula:

Security score=Total Rule Score/Total Max Score*100

Thus, in FIG. 7A, the security score is shown computed as 12/14*100=86%. Similarly, in FIG. 7B, table 740 depicts the manner in which rule scores (and accordingly the security score) are calculated for attribute values in data portion 730. In FIG. 7C, table 760 depicts the manner in which rule scores (and accordingly the security score) are calculated for attribute values in data portion 750.

Referring again to FIG. 4, score calculator 440, after computing the security score for the received definition data based on the checking against the security rules of rules data 420, sends the computed security score (along with any warnings identified) to connector validator 410. The manner in which the computed security score is used for providing security compliance in integration connectors is described below with examples.

8. Providing Security Compliance

According to an aspect, connector validation 410 receives the computed security score from score calculator 440 and sends (via path 142) the computed security score and identified warnings to an end-user system (one of 110), which in turn displays, on a display unit associated with the end-user system, the security score and warnings to a user such as a developer of the integration connector or workflow.

According to another aspect, connector validator 410 also determines whether the computed security score is above a threshold (a pre-defined/pre-configured value such as 80%). If the security score is determined to be above the threshold, connector validator 410 enables (via path 134) the integration connector. Such enabling may entail approving the integration connector for hosting in the iPaaS platform and/or deploying and executing (by sending appropriate commands via path 134) the integration connector in one of nodes 135/165/175. In a scenario that the integration connector is already hosted/deployed, such enabling may entail making the integration connector available to public (external services).

It should be noted that both the aspects above merely provide guidance to the developer on the security compliance of the integration connectors sought to be validated. A developer may deploy or continue to employ an integration connector for interfacing with a target service, even though the security score may be low (for example, 50% for the integration connector of FIG. 7C). Some such use cases of using compliance tool 150 for guidance of developers is described in detail below.

In one use case, a developer (vendor) sets up a relevant development environment for a RAB (Rapid Adapter Builder) software, builds a connector definition (data) using the RAB development tool kit, includes relevant security settings in the connector definition to achieve the connectivity use cases, validates the connector locally, and uploads the connector on the iPaaS integration platform. In response to the upload, compliance tool 150 validates the connector definition, performs lexical validation of the connector definition, computes the security score for the connector, and accepts/rejects (for deployment/execution) the integration connector based on the computer security score.

In another use case, a developer of as integration workflow searches on the integration platform for a pre-built/out-of-box connector to a desired target application, and uses the pre-built connector if found. However, if such a pre-built connector is not found, the integration developer tries to find a (third-party) connector on the market place for integration. If such a third-party connector is found, the marketplace displays information about the connector along with its security score and security warnings (performed by compliance tool 150). If the integration developer deems the score to be satisfactory, the integration developer enables the third-party connector on the integration platform. The third-party connector can thereafter be used on the platform to build integration flows.

Aspects of the present disclosure also ensure that security compliance is enforced during the run-time of the integration connector as described in detail below.

Referring again to FIG. 4, connector enforcer 460 monitors (via path 134) the run-time operation of the (deployed and executing) integration connector (for example, 220-1). Such monitoring may entail intercepting the packets sent/received (on paths 221 and 223) by the integration connector and inspecting the intercepted packets. The integration connector may have been previously been validated by compliance tool 150.

Specifically, connector enforcer 460 checks whether a security rule of the set of security rules maintained in rules data 420 has been violated. A security rule is deemed to be violated if a condition indicated in the security rule (column 616 of table 600) is determined to be not satisfied by at least one packet/communication made by the integration connector (being monitored). If a violation is identified, connector enforcer 460 stops the operation of the integration connector by sending appropriate commands (via path 134) to the integration connector and/or integration platform.

Connector enforcer 460 also sends (via path 142) an error indicating the (specific) security rule that has been violated to one of end-user systems 110, with the error subsequently being display on a display unit (not shown) associated with the end-user system. Some sample user interfaces that may be provided as part of security compliance in integration connectors is described below with examples.

9. Sample User Interfaces

FIGS. 8A-8E illustrate sample user interfaces displayed while providing security compliance in integration connectors. Display area 800 represents a portion of a user interface displayed on a display unit (not shown) associated with one of end-user systems 110. In one embodiment, display area 800 corresponds to a web page rendered by a browser executing on the end-user system. The web pages may be provided by the iPaaS integration platform in response to a user (e.g., developer) sending appropriate requests (for example, by specifying corresponding Uniform Resource Locator (URL) in an address bar) using the browser.

Figure 8A:
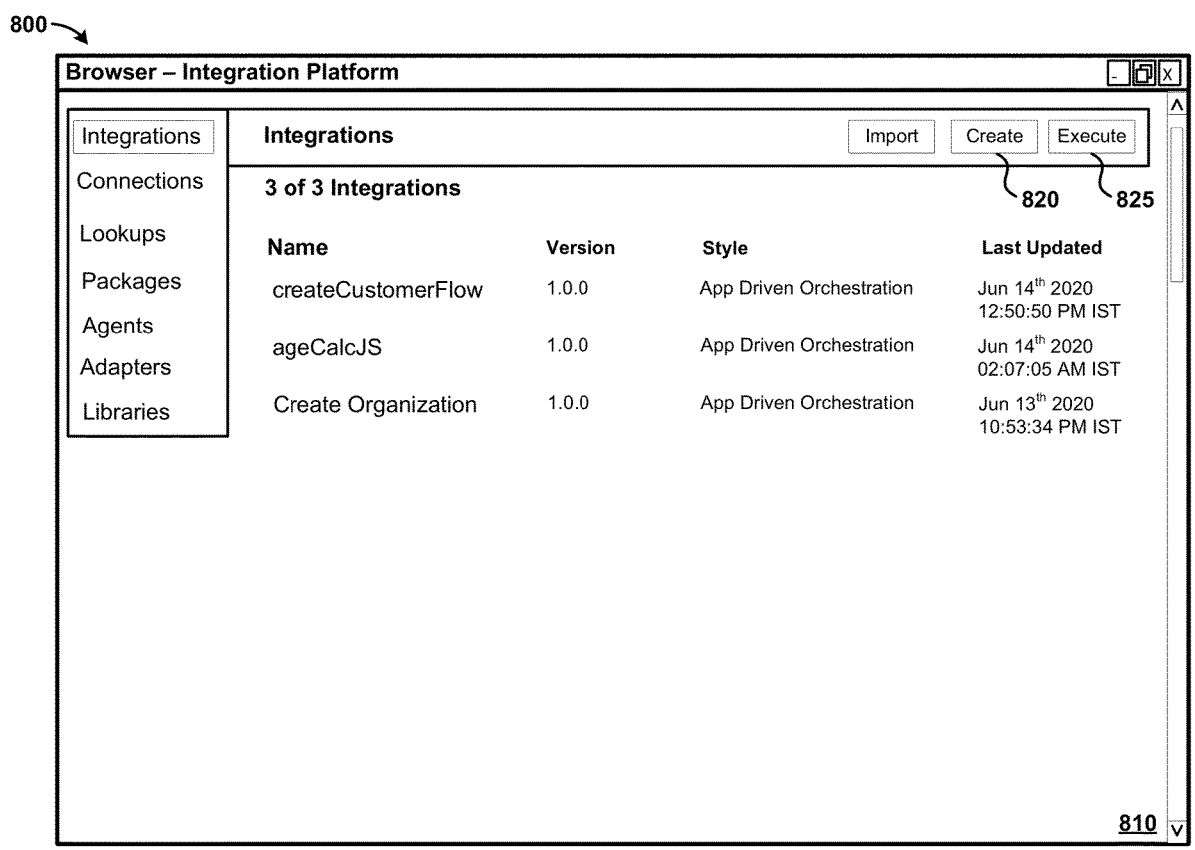
FIGS. 8A-8E illustrate sample user interfaces displayed while providing security compliance in integration connectors.

Referring to FIG. 8A, display area 810 depicts a list of integrations (workflows) currently specified in the integration platform. The user may select/click on "Create" button 820 to create a new workflow or select one of the integrations shown in display area 810 and select/click on "Execute" button 825 to cause execution of the integration/workflow. The description is continued assuming the user had selected "Create" button 820.

Figure 8B:
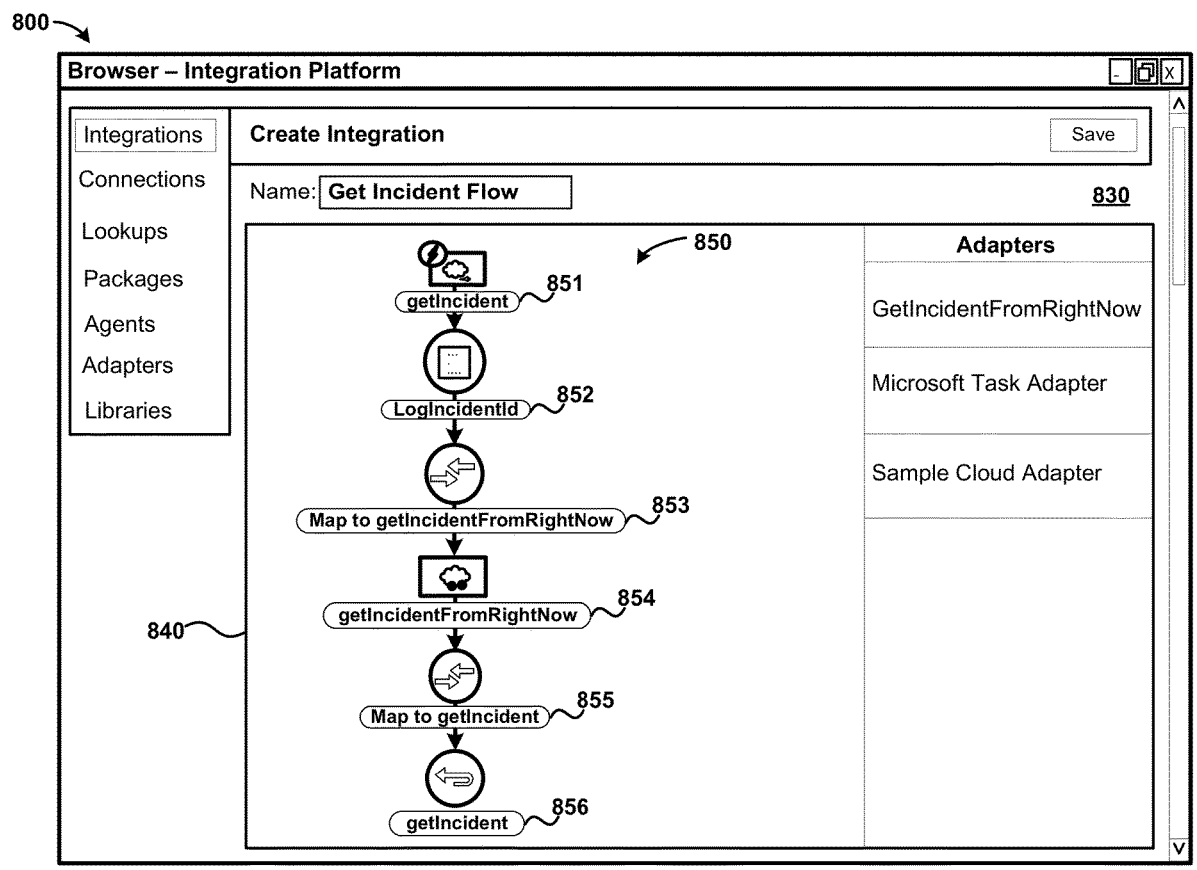

Referring to FIG. 8B, display area 830 depicts a portion of the user interface provided to the user upon selecting "Create" button 820. The user is enabled to provide a name ("Sample Incident Flow") for the new workflow. Display area 840 enables the user to create a desired workflow by dragging and dropping desired adapters, processes, etc. from the right-hand panel shown there. Workflow 850 shown there is named "Get Incident Flow" is designed to get incident details from another backend service (in this case, Oracle™ Service Cloud) for an incident ID (identifier) and send the incident details to the caller as a response.

Workflow 850 is shown containing various actions such as getIncident REST call (851), a logger action (852) for logging the incoming incident ID, a mapper action (853) for mapping the incoming inputs to the inputs of a adapter named "GetIncidentFromRightNow", an invocation (854) of the GetIncidentFromRightNow adapter which in turn invokes the backend service, a mapper action (855) for mapping the output of the invocation of the backend service to the outputs of getIncident call, and a return action (856) indicating the end of the workflow.

During operation, the REST call (851) is triggered when an external service sends a corresponding REST request to the URL where workflow 850 is hosted. The getIncidentFromRightNow Adapter is invoked, which in turn gets the incident details from the backend service. The incident response is returned. A logging message is created and logged to the activity stream for viewing. The manner in which the getIncidentFromRightNow Adapter may be managed is described in detail below.

Figure 8C:
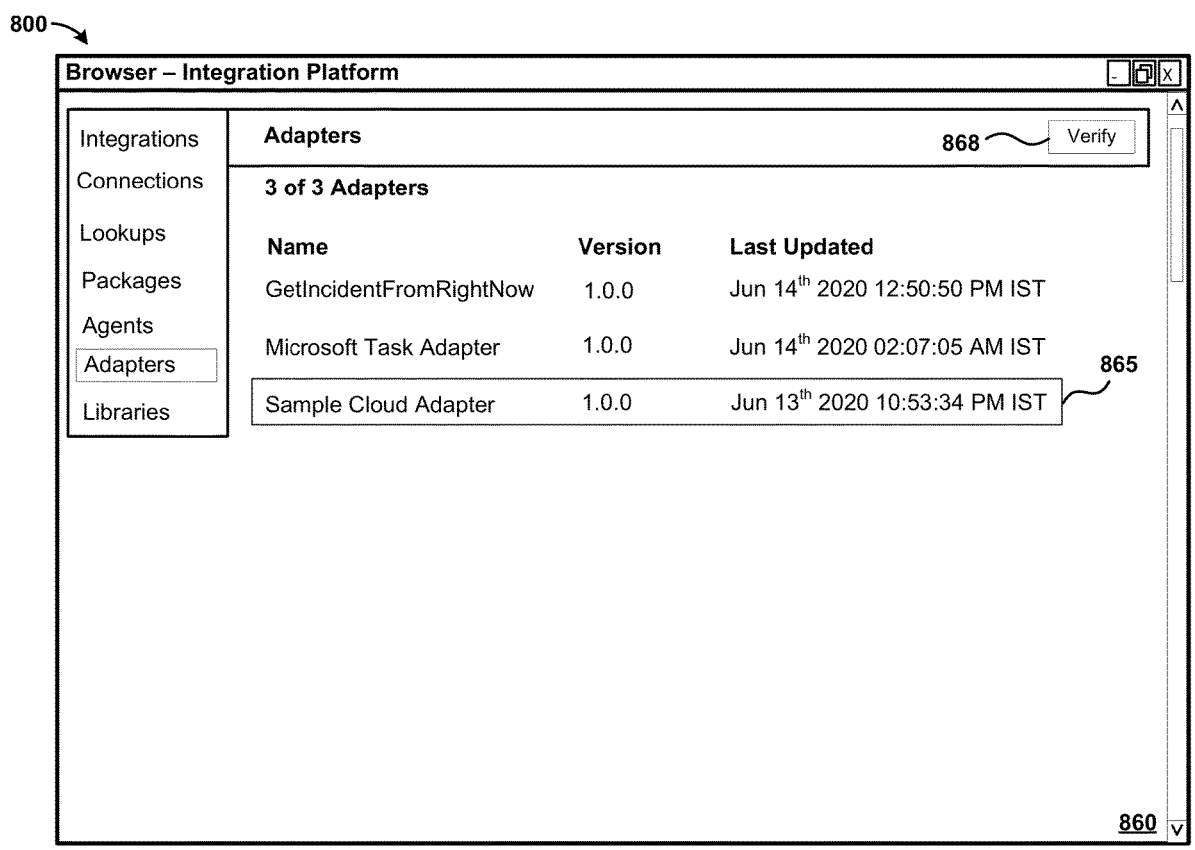

Referring to FIG. 8C, display area 860 depicts a list of adapters/integration connectors currently specified/hosted in the integration platform. The user may select one of the adapters shown in display area 860 and select/click on "Verify" button 868 to cause validation of the definition data of the selected adapter. The description is continued assuming the user had selected the "Sample Cloud Adapter" shown in display area 865 and clicked the "Verify" button 868.

Figure 8D:
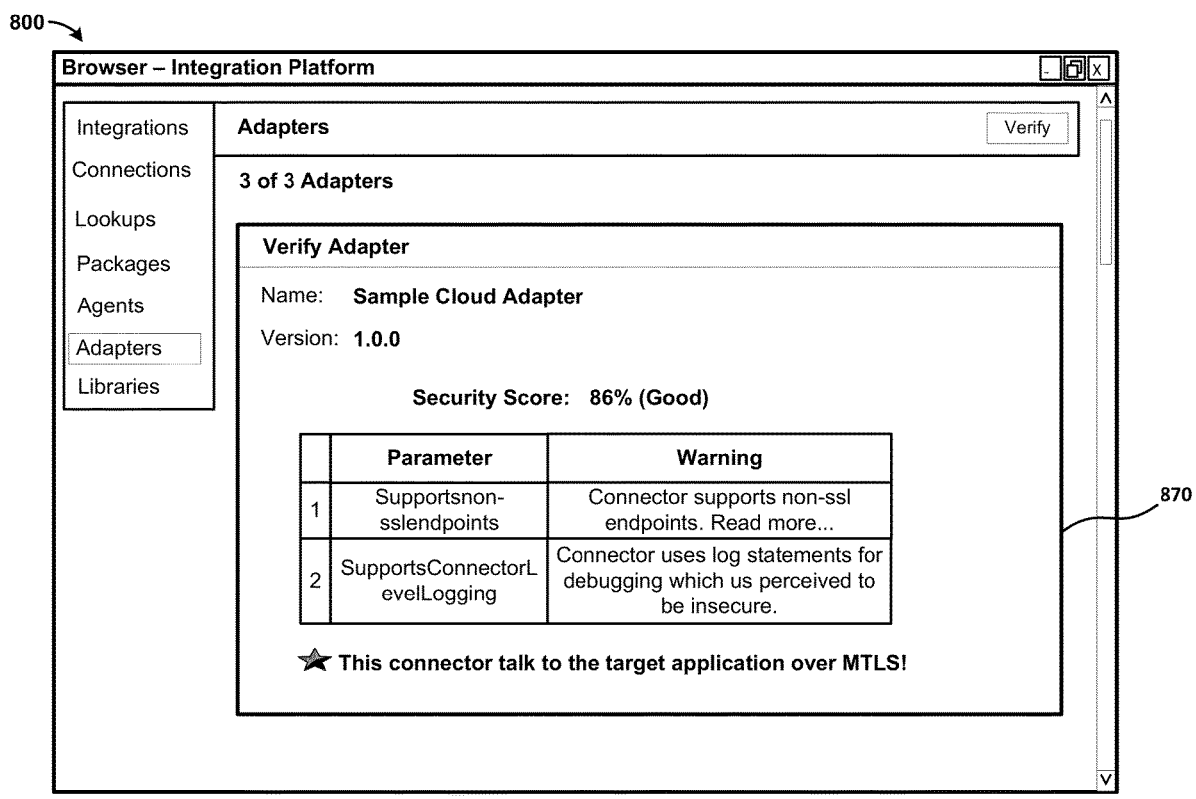

Referring to FIG. 8D, display area 870 depicts a portion of the user interface (in one embodiment, a pop-up window) provided to the user upon selecting "Verify" button 868. Upon button 868 being selected/clicked, the integration platform sends the definition data of the selected adapter ("Sample Cloud Adapter") to compliance tool 150, and receives in response a computed security score and warnings identified for the definition data by compliance tool 150. The integration platform then displays the display area 870 which indicates the specific integration connector/adapter being verified, the security score and the specific warnings identified.

Thus, a user/developer is facilitated to validate the adapter/integration connector of interest. After validation, based on the security score and warnings, the user/developer may decide to use the selected adapter in the creation of workflows (using the user interface of display area 840).

As noted above, compliance tool 150 also provides security compliance during the run-time operation of the integration connectors. The manner in which such run-time compliance may be provided is described in detail below.

Figure 8E:
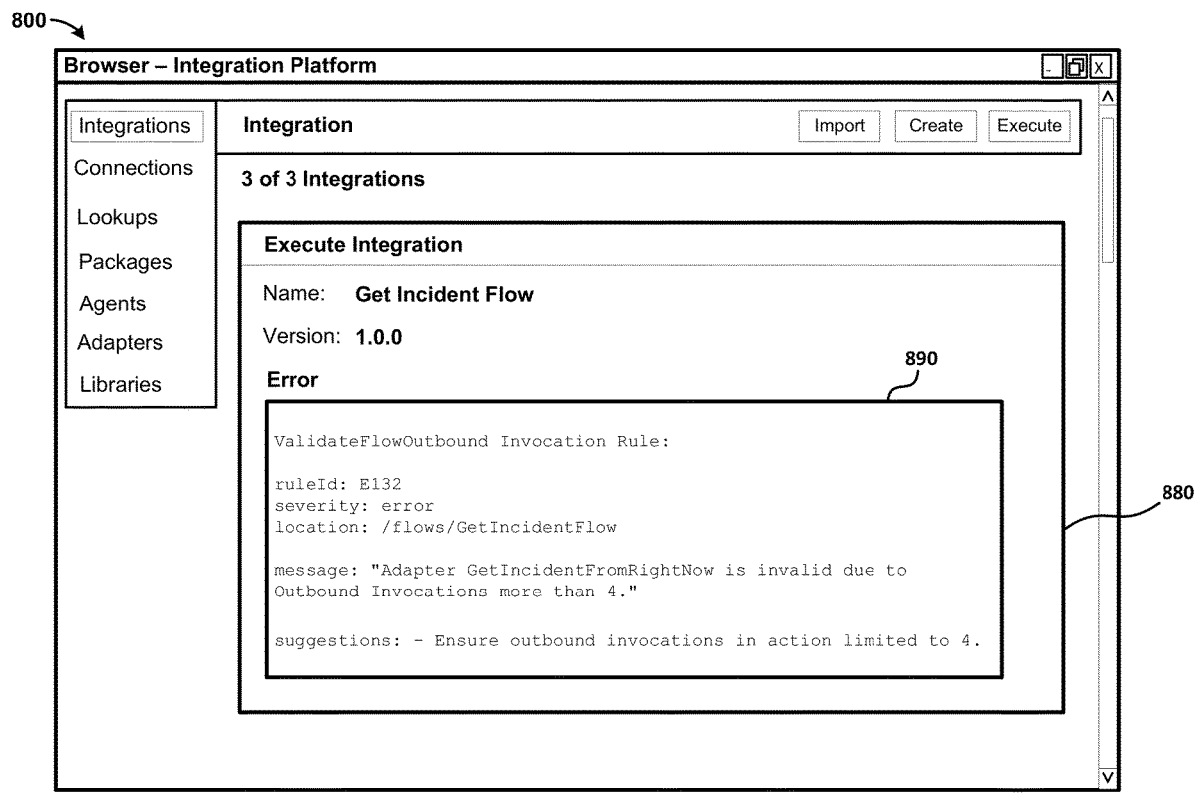

Referring to FIG. 8E, display area 880 depicts a portion of the user interface (in one embodiment, a pop-up window) provided to the user upon a user selecting one (assumed to be "Get Incident Flow") of the integrations and selecting "Execute" button 825. Upon button 825 being selected/clicked, the integration platform starts execution of the selected workflow ("Get Incident Flow"), with compliance tool 150 monitoring the execution of the adapter named "getIncidentFromRightNow" during such execution. Upon compliance tool 150 determining that the adapter has caused a violation of the security rule, compliance tool 150 sends an error message to the integration platform, which in turn displays the error in display area 890.

Thus, compliance tool 150 provides a system for discerning the security levels of an integration connector by evaluating a host of parameters to arrive at a security score. The same system can be used to publish a list of potential security concerns which can help platform users from making informed decisions about selecting a desired integration connector in addition to other factors. The system further ensures that a connector adheres to the security levels associated with it by prohibiting any usage outside of the advertised security features of a given connector.

It should be further appreciated that the features described above can be implemented in various embodiments as a desired combination of one or more of hardware, software, and firmware. The description is continued with respect to an embodiment in which various features are operative when the software instructions described above are executed.

10. Digital Processing System

Figure 9:
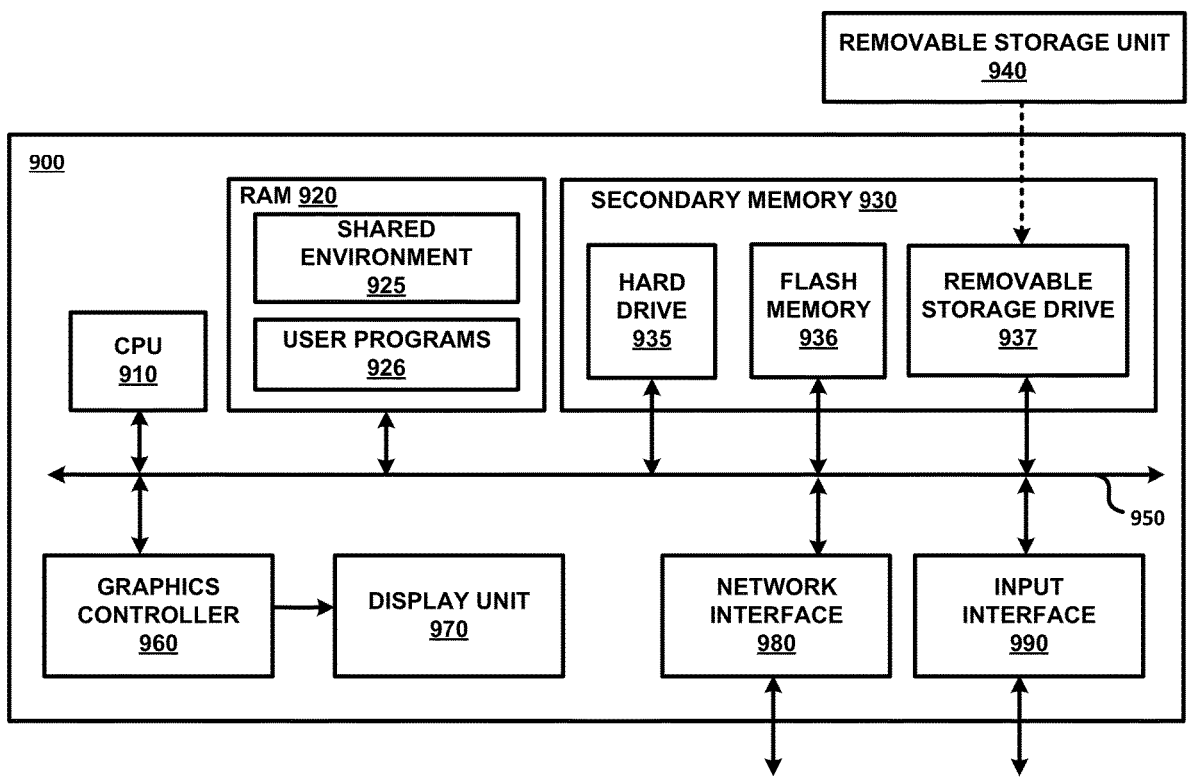
FIG. 9 is a block diagram illustrating the details of a digital processing system in which various aspects of the present disclosure are operative by execution of appropriate executable modules.

FIG. 9 is a block diagram illustrating the details of digital processing system (1000) in which various aspects of the present disclosure are operative by execution of appropriate executable modules. Digital processing system 900 may correspond to compliance tool 150 or nodes 135/165/175 implementing the iPaaS integration platform.

Digital processing system 900 may contain one or more processors such as a central processing unit (CPU) 910, random access memory (RAM) 920, secondary memory 930, graphics controller 960, display unit 970, network interface 980, and input interface 990. All the components except display unit 970 may communicate with each other over communication path 950, which may contain several buses as is well known in the relevant arts. The components of FIG. 9 are described below in further detail.

CPU 910 may execute instructions stored in RAM 920 to provide several features of the present disclosure. CPU 910 may contain multiple processing units, with each processing unit potentially being designed for a specific task. Alternatively, CPU 910 may contain only a single general-purpose processing unit.

RAM 920 may receive instructions from secondary memory 930 using communication path 950. RAM 920 is shown currently containing software instructions constituting shared environment 925 and/or other user programs 926 (such as other applications, DBMS, etc.). In addition to shared environment 925, RAM 920 may contain other software programs such as device drivers, virtual machines, etc., which provide a (common) run time environment for execution of other/user programs.

Graphics controller 960 generates display signals (e.g., in RGB format) to display unit 970 based on data/instructions received from CPU 910. Display unit 970 contains a display screen to display the images defined by the display signals (e.g., portions of the user interfaces of FIGS. 8A-8E). Input interface 990 may correspond to a keyboard and a pointing device (e.g., touch-pad, mouse) and may be used to provide inputs (e.g., for the portions of the user interfaces of FIGS. 8A-8E). Network interface 980 provides connectivity to a network (e.g., using Internet Protocol), and may be used to communicate with other systems connected to the networks.

Secondary memory 930 may contain hard drive 935, flash memory 936, and removable storage drive 937. Secondary memory 930 may store the data (e.g., data shown in FIGS. 5A-5B, 6, 7A-7C and Appendix A) and software instructions (e.g., for performing the actions of FIG. 3, for implementing the blocks of FIGS. 2 and 4), which enable digital processing system 900 to provide several features in accordance with the present disclosure. The code/instructions stored in secondary memory 930 may either be copied to RAM 920 prior to execution by CPU 910 for higher execution speeds, or may be directly executed by CPU 910.

Some or all of the data and instructions may be provided on removable storage unit 940, and the data and instructions may be read and provided by removable storage drive 937 to CPU 910.

Removable storage unit 940 may be implemented using medium and storage format compatible with removable storage drive 937 such that removable storage drive 937 can read the data and instructions. Thus, removable storage unit 940 includes a computer readable (storage) medium having stored therein computer software and/or data. However, the computer (or machine, in general) readable medium can be in other forms (e.g., non-removable, random access, etc.).

In this document, the term "computer program product" is used to generally refer to removable storage unit 940 or hard disk installed in hard drive 935. These computer program products are means for providing software to digital processing system 900. CPU 910 may retrieve the software instructions, and execute the instructions to provide various features of the present disclosure described above.

The term "storage media/medium" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage memory 930. Volatile media includes dynamic memory, such as RAM 920. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media.

Transmission media participates in transferring information between storage media. For example, transmission media includes coaxial cables, copper wire and fiber optics, including the wires that comprise bus 950. Transmission media can also take the form of acoustic or light waves, such as those generated during radio-wave and infra-red data communications.

Reference throughout this specification to "one embodiment", "an embodiment", or similar language means that a particular feature, structure, or characteristic described in connection with the embodiment is included in at least one embodiment of the present disclosure. Thus, appearances of the phrases "in one embodiment", "in an embodiment" and similar language throughout this specification may, but do not necessarily, all refer to the same embodiment.

Furthermore, the described features, structures, or characteristics of the disclosure may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the disclosure.

It should be understood that the figures and/or screen shots illustrated in the attachments highlighting the functionality and advantages of the present disclosure are presented for example purposes only. The present disclosure is sufficiently flexible and configurable, such that it may be utilized in ways other than that shown in the accompanying figures.

10. Conclusion

While various embodiments of the present disclosure have been described above, it should be understood that they have been presented by way of example only, and not limitation. Thus, the breadth and scope of the present disclosure should not be limited by any of the above-described exemplary embodiments, but should be defined only in accordance with the following claims and their equivalents.

It should be understood that the figures and/or screen shots illustrated in the attachments highlighting the functionality and advantages of the present disclosure are presented for example purposes only. The present disclosure is sufficiently flexible and configurable, such that it may be utilized in ways other than that shown in the accompanying figures.

Further, the purpose of the following Abstract is to enable the Patent Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present disclosure in any way.

What is claimed is:

1. A method for providing security compliance in integration connectors, said method comprising:
   receiving a definition data specifying implementation details of an integration connector, wherein said definition data contains a set of attributes and corresponding values;
   checking by inspecting said definition data, whether said implementation details are in compliance with a set of security rules, wherein a first security rule of said set of security rules indicates a first attribute of said set of attributes and a first condition,
   wherein said checking checks whether a first value specified for said first attribute in said definition data satisfies said first condition to determine said compliance with said first security rule; and
   computing a security score for said integration connector based on said compliance with said set of security rules determined by said checking.

2. The method of claim 1, further comprising:
   displaying to a user, said security score for said integration connector along with a set of warnings about said compliance.

3. The method of claim 2, wherein said computing comprises:
   evaluating said compliance of said definition data with each security rule of said set of security rules to determine a corresponding rule score; and
   calculating said security score based on said corresponding rule scores for said set of security rules,
   wherein said evaluating determines a first rule score if said first value satisfies said first condition,
   wherein said calculating adds said first rule score to said security score.

4. The method of claim 3, wherein said definition data is used to generate a software component representing said integration connector, wherein said software component is designed to provide a front-end to a target component such that source components communicate with said software component for interfacing with said target component.

5. The method of claim 4, wherein a second security rule of said set of security rules indicates a second condition,
   wherein said checking checks whether said second condition is satisfied based on the values for two or more of said set of attributes specified in said definition data,
   wherein said evaluating determines a second rule score if said second condition is satisfied,
   wherein said calculating adds said second rule score to said security score.

6. The method of claim 1, further comprising:
   monitoring a run-time operation of said integration connector;
   identifying, based on said monitoring, that a security rule of said set of security rules has been violated;
   in response to said identifying:
     stopping the operation of said integration connector; and
     sending an error indicating that said security rule has been violated.

7. The method of claim 6, wherein a third security rule of said set of security rules indicates a limit on a run-time characteristic,
   wherein said monitoring monitors a run-time value of said run-time characteristic during operation of said integration connector, wherein said identifying identifies that said third security rule has been violated when said run-time value exceeds said limit, wherein said error indicates that said third security rule has been violated.

8. The method of claim 7, wherein a fourth security rule of said set of security rules indicates a run-time policy to be applied during operation, wherein said monitoring monitors a policy applied during operation of said integration connector, wherein said identifying identifies that said fourth security rule has been violated when said policy applied does not match said run-time policy, wherein said error indicates that said fourth security rule has been violated.

9. The method of claim 4, wherein said software component is deployed in a first node of a plurality of nodes in a computing infrastructure, said method further comprising:

determining whether said security score is above a threshold; and if said security score is determined to be above said threshold, enabling said integration connector on said first node of said plurality of nodes, wherein after said enabling, said source components deployed in said plurality of nodes are facilitated to interface with said target component deployed in said plurality of nodes via said software component.

10. The method of claim 9, wherein said definition data is received from an end-user system in response to a user creating a work flow using said integration connector, wherein said definition data specifies said target component to be provided access by said integration connector, specific authentication/authorization used for said access, policies to be applied during said access, and details of packets to be sent/received from said target component.

11. A non-transitory machine-readable medium storing one or more sequences of instructions for providing security compliance in integration connectors, wherein execution of said one or more instructions by one or more processors contained in a digital processing system cause said digital processing system to perform the actions of:

receiving a definition data specifying implementation details of a software component representing an integration connector facilitating access to a target component, wherein said software component is designed to provide a front-end to said target component such that source components communicate with said software component for interfacing with said target component;

checking by inspecting said definition data, whether said implementation details are in compliance with a set of security rules; and computing a security score for said integration connector based on said compliance determined by said checking.

12. The non-transitory machine-readable medium of claim 11, wherein said definition data specifies said target component to be provided access by said integration connector, specific authentication/authorization used for said access, policies to be applied during said access, and details of packets to be sent/received from said target component, further comprising one or more instructions for:

displaying to a user, said security score for said integration connector along with a set of warnings about said compliance.

13. The non-transitory machine-readable medium of claim 11, wherein said computing comprises:

evaluating said compliance of said definition data with each security rule of said set of security rules to determine a corresponding rule score; and calculating said security score based on said corresponding rule scores for said set of security rules.

14. The non-transitory machine-readable medium of claim 11, further comprising one or more instructions for:

monitoring a run-time operation of said integration connector;

identifying, based on said monitoring, that a security rule of said set of security rules has been violated;

in response to said identifying:
stopping the operation of said integration connector; and
sending an error indicating that said security rule has been violated.

15. The non-transitory machine-readable medium of claim 11, wherein said software component is deployed in a first node of a plurality of nodes in a computing infrastructure, further comprising one or more instructions for:

determining whether said security score is above a threshold; and if said security score is determined to be above said threshold, enabling said integration connector on said first node of said plurality of nodes, wherein after said enabling, said source components deployed in said plurality of nodes are facilitated to interface with said target component deployed in said plurality of nodes via said software component.

16. A digital processing system comprising:

a random access memory (RAM) to store instructions for providing security compliance in integration connectors; and one or more processors to retrieve and execute the instructions, wherein execution of the instructions causes the digital processing system to perform the actions of:

receiving a definition data specifying implementation details of an integration connector, wherein said definition data contains a set of attributes and corresponding values;

checking by inspecting said definition data, whether said implementation details are in compliance with a set of security rules, wherein a first security rule of said set of security rules indicates a first attribute of said set of attributes and a first condition, wherein said checking checks whether a first value specified for said first attribute in said definition data satisfies said first condition to determine said compliance with said first security rule; and computing a security score for said integration connector based on said compliance with said set of security rules determined by said checking.

17. The digital processing system of claim 16, wherein said definition data is used to generate a software component representing said integration connector, wherein said software component is designed to provide a front-end to a target component such that source components communicate with said software component for interfacing with said target component, further performing the actions of:

displaying to a user, said security score for said integration connector along with a set of warnings about said compliance.

18. The digital processing system of claim 17, wherein for said computing, said digital processing system performs the actions of:

evaluating said compliance of said definition data with each security rule of said set of security rules to determine a corresponding rule score; and calculating said security score based on said corresponding rule scores for said set of security rules, wherein said evaluating determines a first rule score if said first value satisfies said first condition, wherein said calculating adds said first rule score to said security score.

19. The digital processing system of claim 16, further performing the actions of:

monitoring a run-time operation of said integration connector;

identifying, based on said monitoring, that a security rule of said set of security rules has been violated;

in response to said identifying:

stopping the operation of said integration connector; and sending an error indicating that said security rule has been violated.

20. The digital processing system of claim 17, wherein said software component is deployed in a first node of a plurality of nodes in a computing infrastructure, further performing the actions of:

determining whether said security score is above a threshold; and if said security score is determined to be above said threshold, enabling said integration connector on said first node of said plurality of nodes, wherein after said enabling, said source components deployed in said plurality of nodes are facilitated to interface with said target component deployed in said plurality of nodes via said software component.

* * * * *